United States Patent [19]

Crimmins

[11] Patent Number: 4,573,197
[45] Date of Patent: Feb. 25, 1986

[54] METHOD FOR AUTOMATIC RECOGNITION OF TWO-DIMENSIONAL SHAPES

[76] Inventor: Thomas R. Crimmins, 555 E. William, Apt. 20-A, Ann Arbor, Mich. 48104

[21] Appl. No.: 561,156

[22] Filed: Dec. 13, 1983

[51] Int. Cl.⁴ ............................................. G06K 9/78
[52] U.S. Cl. ...................................... 382/22; 382/31; 382/43; 364/726
[58] Field of Search ............................ 382/22, 31, 43; 364/726

[56] References Cited

U.S. PATENT DOCUMENTS

4,225,850 9/1980 Chang et al. ........................ 364/726

*Primary Examiner*—Leo H. Boudreau
*Assistant Examiner*—Jacqueline Todd
*Attorney, Agent, or Firm*—Krass and Young

[57] ABSTRACT

A method of automatically recognizing objects in a digital image. The pixel coordinates of the boundary of the objects are identified and stored as data. A series of Fourier coefficients describing the boundary of the object are calculated and used to generate a set of descriptors. The descriptors are stored and compared with similarly generated descriptors of other objects to determine correspondence therebetween.

6 Claims, 10 Drawing Figures

DIGITIZED

Fig-3

BOUNDARY OF OBJECT

Fig-4

VERTICES OF BOUNDARY

Fig-5

ALTERNATE NUMBERING OF VERTICES

*Fig-8*

ORDER IN WHICH NON-ZERO FOURIER COEFFICIENTS ARE FOUND

METHOD FOR AUTOMATIC RECOGNITION OF TWO-DIMENSIONAL SHAPES

DESCRIPTION

1. Technical Field

This invention relates to image processing techniques and, more particularly, to a method of automatically recognizing objects in digitized images.

2. Background

Digital image processing is used in a wide variety of applications where it is necessary to be able to automatically recognize given objects in a scene. Such applications include character recognition systems, workpiece inspection systems, and as machine vision systems used to control the operation of a robot manipulator. Typically, the scene containing the object of interest is scanned and stored as a digitized matrix of pixels. The pixel matrix is then analyzed and an output is generated as a function thereof. In many cases the output indicates whether a given object is located within the scanned scene.

The recognition of objects is an easy task for a human but is quite difficult for machines. Machines must use some a priori information describing the objects of interest as criteria for classifying or recognizing objects in the digitized pixel matrix. The a priori information is often referred to as signatures. The signatures are stored and used to compare them with the signatures generated during the automatic analysis of the pixel matrix. The manner in which the signatures have been defined vary considerably. One such approach is to use Fourier descriptors. Using this approach the boundary of the object is parameterized and the parameterizing function is expressed as a series of Fourier coefficients. It has been shown that if two objects have the same shape then the corresponding moduli of their Fourier coefficients will be equal. However, the reverse is not true. In other words, just because the moduli of Fourier coefficients of two objects happen to be the same, this does not mean that the two objects necessarily have the same shape. Consequently, these limited Fourier descriptors cannot be used to define signatures in machines where highly accurate object recognition capabilities are important.

For further background information relating to the use of Fourier descriptors see:

1. G. H. Granlund, "Fourier preprocessing for hand print character recognition," *IEEE Trans. Comput.*, Vol. C-21, no. 2, pp. 195–201, February 1972.
2. C. W. Richard, Jr. and H. Hemani, "Identification of three-dimensional objects using Fourier descriptors of the boundary curve," *IEEE Trans. Syst., Man, Cybern.*, Vol. SMC-4, no. 4, pp. 371–378, July 1974.
3. C. T. Zahn and R. Z. Roskies, "Fourier descriptors for plane closed curves," *IEEE Trans. Comput.*, vol. C-31, no. 3, pp. 269–281, March 1972.
4. E. Persoon and K. S. Fu, "Shape discrimination using Fourier descriptors," *IEEE Trans. Syst., Man, Cybern.*, vol. SMC-7, pp. 170–179, March 1977.

SUMMARY OF THE INVENTION

The present invention involves a method of automatically recognizing objects in a digital image where the pixel coordinates of the boundary of the object have been identified and stored as data. From that data a series of Fourier coefficients associated with the boundary of the object are calculated. A given number of the Fourier coefficients are tested in a predetermined order for nonzero values. A series of integers are assigned values corresponding to the subscript of each nonzero Fourier coefficient that is encountered during the test. A first shape descriptor S is defined as the number of nonzero Fourier coefficients discovered during the test. Second ($a_n$) and third ($b_{n,j}$) shape descriptors are calculated according to formulae set forth herein. The second descriptors are functions of the absolute values of the nonzero Fourier coefficients and the third descriptors are derived from products of predetermined Fourier coefficients raised to powers derived from a function of the difference between the previously calculated integer values. The first, second and third descriptors are stored and compared with similarly calculated descriptors of other objects. A match between all of the descriptors is used to automatically recognize the shape of the other objects. Other descriptors can be calculated relating to the orientation, size and location of the objects in the manner to be described and these further descriptors can be used in the automatic recognition process.

The shape descriptors calculated according to the method of this invention is complete in the sense that two objects have the same shape if and only if they have the same set of descriptors. In other words, if the descriptors are the same then the objects must have the same shape. A more detailed explanation of the descriptors and how they are derived are described in the following specification.

BRIEF DESCRIPTION OF THE DRAWINGS

The various advantages of the present invention will become apparent to those skilled in the art upon reading the following specification and by reference to the drawings in which.

DESCRIPTION OF THE PREFERRED EMBODIMENT

Following the mandate of the patent laws, particularly 35 USC 112, this specification contains a written description of the invention in such full, clear, concise and exact terms to enable any person skilled in the pertinent art to make and use the same. Those persons skilled in this art area have a good working knowledge of the manner in which shapes can be expressed using Fourier descriptors as exemplified in the literature cited in the Background portion of this application. Consequently, the following specification will be described using a number of formulae as this is believed to be the clearest and most concise manner of describing the present invention to the skilled practitioner. The proofs and other more detailed information relating to the theorems discussed herein are found in the inventor's article "A Complete Set of Fourier Descriptors for Two-Dimensional Shapes", *IEEE Trans. Syst. Man, Cybern.*, vol. SMC-12, no. 6, November/December 1982 (printed in January of 1983), pp. 848–855. This article is hereby incorporated by reference.

The following specification is broken into three main parts: An overview, a generalized description of the method, and a particular example employing the equations utilized in the general description.

A. Overview

Figures 1, 2:
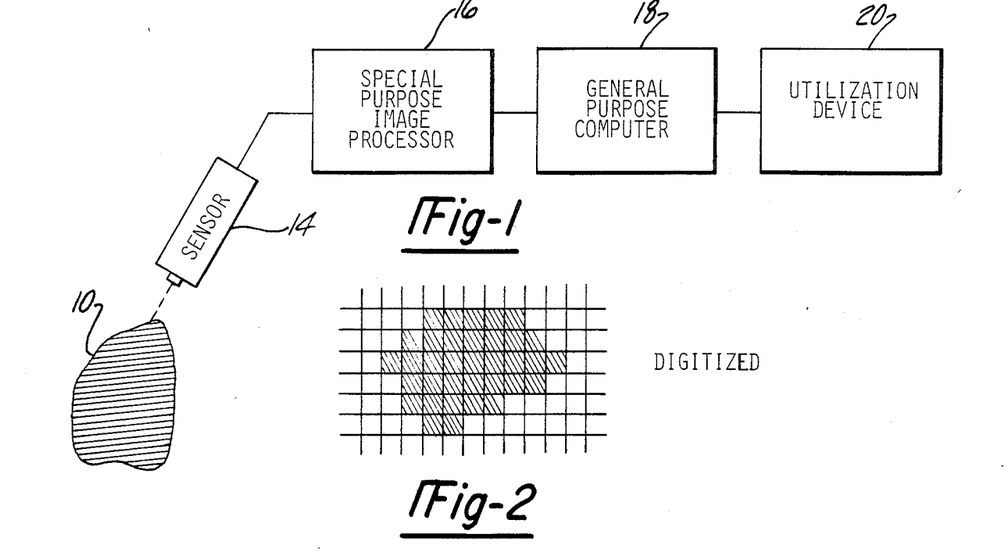
FIG. 1 is a block diagram of electronic components that may be used to carry out the method of this invention.
FIG. 2 is a view schematically illustrating a digitized matrix of an object.

FIG. 1 illustrates in simplified form the hardware components that can be used to perform the method of this invention. An object 10 is sensed by a sensor such as a suitable video camera, infrared sensor, radar or the like. This sensor is represented by the component 14. The output of the sensor 14 is processed into a digitized image containing a matrix of picture elements or pixels. An example of the digitized image is shown in FIG. 2. The pixels defining the object 10 have certain values and the pixels outside of the object forming the background have other values. Typically, the object pixels have values of one and the background pixels have values of zero.

Figure 3:
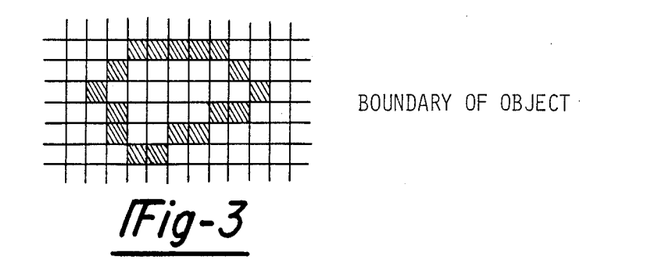
FIG. 3 is a view schematically illustrating a detected boundary of the object in FIG. 2.

Suitable means are employed for finding the boundary pixels of the object as shown in FIG. 3. A variety of known techniques can be employed for this purpose. Special purpose image processors are particularly adapted to accomplish this function and thereby is preferred and shown in FIG. 1 as component 16. One suitable special purpose processor may be the CYTOCOMPUTER ® image processor developed at the Environmental research Institute of Michigan in Ann Arbor, Mich. For a more detailed description of suitable hardware for accomplishing this end the reader is referred to U.S. Pat. Nos. 4,167,728; 4,322,716 and 4,395,698 which are hereby incorporated by reference.

Figure 4:
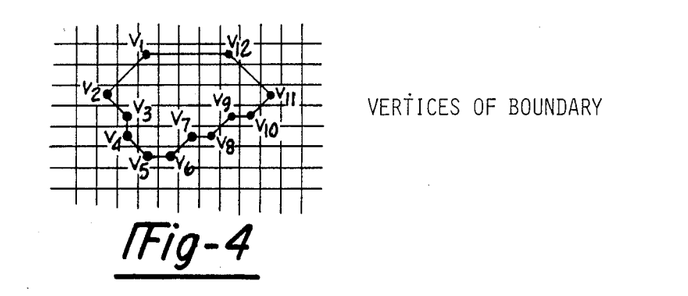
FIG. 4 is a view schematically illustrating a numbering sequence for the vertices of the boundary of the object.
Figure 5:
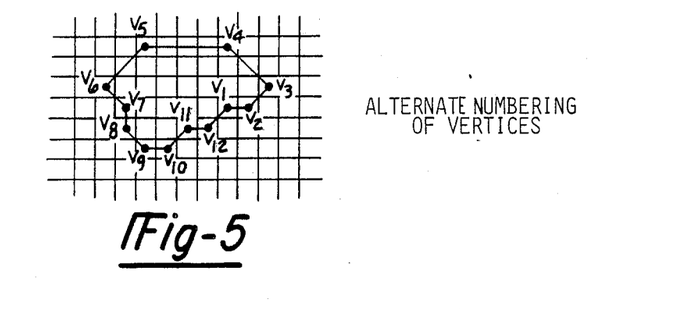
FIG. 5 is a view illustrating an alternative numbering sequence for the vertices for the boundary of the object.

If the centers of these boundary pixels are joined by straight lines in sequence, for example, by going around the object in a counter clockwise direction, then a polygon is formed. The vertices of this polygon are found by the image processor 16. Starting with any vertex, these vertices are numbered in sequence, again going around the object in a counter clockwise direction. FIGS. 4 and 5 show two such enumerations of the vertices using different starting vertices. Any such enumeration of the vertices may be used. The coordinates of these vertices, i.e. the pixel numbers and line numbers of the pixels of which they are the centers, are then output in whichever enumerating sequence is chosen. It should be understood, however, that the descriptors which will be computed are independent of the choice of the starting vertex and, therefore, any convenient order may be chosen as long as they are in sequence.

The output of image processor 16 thus contains pixel coordinates of the boundary of the objects in the digital image, the pixel coordinates having been identified and stored as data. In the preferred embodiment, the data is a sequence of coordinates of the vertices of the polygon defining the boundary of the object. This data is input to a general purpose computer 18 which is programmed to perform the calculations and functions described herein. Computer 18 may, for example, consist of a VAX computer manufactured by Digital Equipment Corporation. Bascially, the function of computer 18 is to operate on the data and calculate descriptors of the object. Some of the descriptors relate to the shape of the object whereas other descriptors define its orientation, size and location. This group of descriptors form the signature of the object 10. The signature is stored in memory in computer 18 and used to compare it with similarly calculated signatures of other objects. Typically, many different objects are analyzed and have their signatures stored in computer 18. Then, computer 18 can generate a signature of a new object and compare it with the previously stored signatures. When there is a match between signatures, the computer 18 generates an output which can be coupled to a utilization device 20. The output would signify to the utilization device 20 that the object 10 being sensed matches one of the previously defined signatures thereby automatically "recognizing" the object. The utilization device can use the output of computer 18 in a variety of different manners well within the appreciation of the skilled practitioner.

B. Generalized Description of Method

The first general step is to calculate from the data a series of Fourier coefficients associated with the boundary of the objects. First the object is embedded in the complex plane. This can be envisioned as the process of normalizing the boundary of the object by dividing it by the perimeter and multiplying by $2\pi$ and then generating a parameterization function by mapping points on a unit circle onto the object.

In the preferred embodiment, the Fourier coefficients of the parameterization function are calculated as follows. The input data contains the x and y coordinates of the vertices:

$$v_n = (x_n, Y_n), n = 1, \ldots, N. \qquad \text{Eq. 1}$$

where N is the number of the vertices. For the purpose of the following calculations:

$$x_0 \triangleq x_N, \ y_0 \triangleq y_N. \qquad \text{Eq. 2}$$

From these coordinates, a series of complex numbers $z_n$ are calculated as per:

$$z_n \triangleq x_n + iy_n, \ n = 0, \ldots, N \ (i = \sqrt{-1}). \qquad \text{Eq. 3}$$

Arc lengths along the perimeter of the curve are calculated according to the following equation:

$$d_n \triangleq \sum_{k=1}^{n} |z_k - z_{k-1}| = \sum_{k=1}^{n} [(x_k - x_{k-1})^2 + (y_k - y_{k-1})^2]^{\frac{1}{2}}, \qquad \text{Eq. 4}$$

$\theta_n$, $w_n$ and the zero-order Fourier coefficient are defined in the following equations 5, 6 and 7, respectively:

$$\theta_n \triangleq \frac{2\pi}{d_N} d_n, \ n = 1, \ldots, N, \qquad \text{Eq. 5}$$

$$\theta_0 \triangleq 0.$$

$$w_n \triangleq e^{-i\theta_n}, \ n = 0, \ldots, N. \qquad \text{Eq. 6}$$

-continued $$c_0 \triangleq \frac{1}{2d_N}\left[z_0(\theta_1 - \theta_{N-1} + 2\pi) + \sum_{n=1}^{N-1} z_n(\theta_{n+1} - \theta_{n-1})\right]. \quad \text{Eq. 7}$$

The other Fourier coefficients are defined as follows: For $m \neq 0$, $|m| \leq M$, $$c_m \triangleq \frac{1}{d_N m^2} \sum_{n=1}^{N} \frac{(z_n - z_{n-1})(w_n^m - w_{n-1}^m)}{\theta_n - \theta_{n-1}}. \quad \text{Eq. 8}$$

where M is an integer which determines the number of shape descriptors to be computed, i.e., it limits the number of Fourier coefficients and, therefore, determines the resolution of the transform.

The next step is to calculate a series of integers $s_n$ by testing a given number of the Fourier coefficients in a predetermined order for nonzero values and assigning the integers with values corresponding to the subscript of each nonzero coefficient found during the test so that:

$s_1$ = the subscript value of the first nonzero Fourier coefficient tested;

$s_2$ = the subscript value of the next nonzero Fourier coefficient tested; etc.

Figure 6:
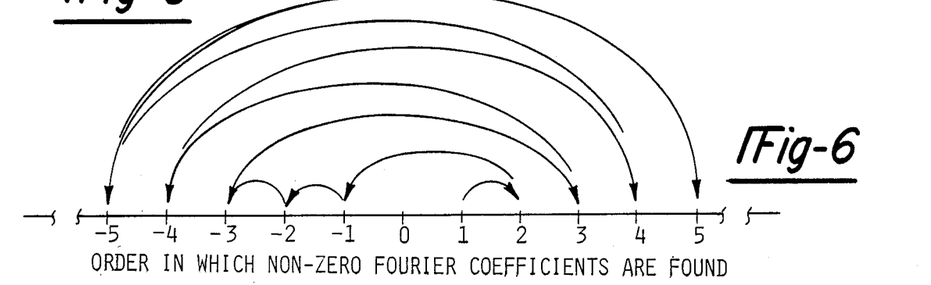
FIG. 6 is a schematic illustration of an order in which nonzero Fourier coefficients are found.
Figure 7:
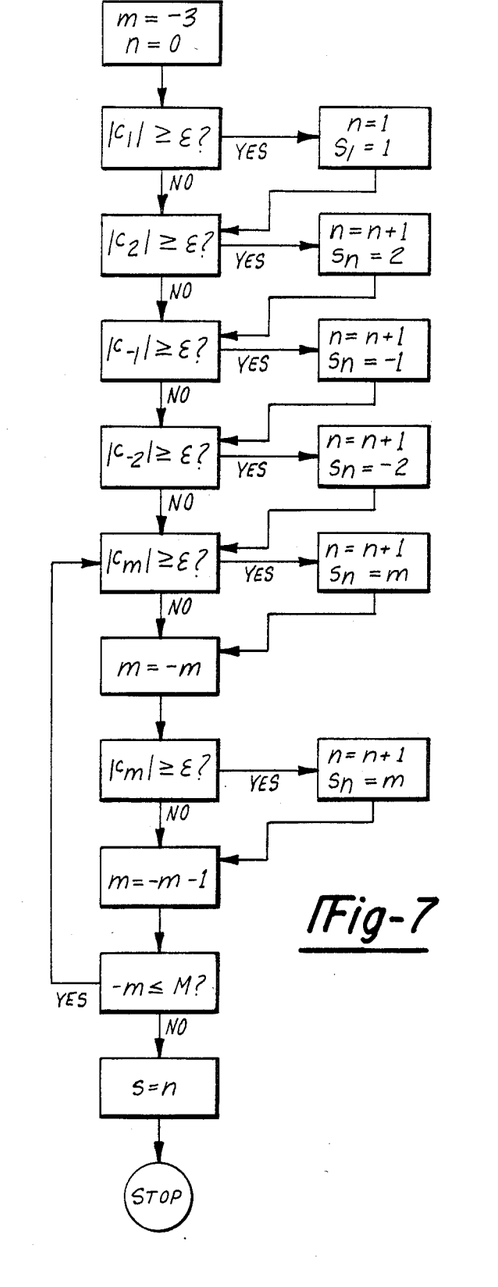
FIG. 7 is a flow chart illustrating a method of testing for nonzero Fourier coefficients and assigning values to integers $s_n$.

FIG. 6 illustrates a satisfactory order for testing the Fourier coefficients and FIG. 7 illustrates an algorithm for defining the sequence of integers $s_n$. In this embodiment each Fourier coefficient $c_n$, for $|n| \leq M$ and excepting $c_o$ are tested in the order illustrated in FIG. 6 to find which one of the Fourier coefficients is the first nonzero one in the ordering, which is the second nonzero one in the ordering, etc. Due to noise, a Fourier coefficient which should theoretically be zero may actually be a small-nonzero complex number. For this reason, the requirement that $c_n$ does not equal zero is replaced by the requirement that $c_n$ be greater than or equal to $\epsilon$ ($\epsilon$ a relatively small number) which is the noise tolerance which may be programmed by the user. The integer $s_1$ is then defined to be the subscript of the first Fourier coefficient $c_n$ in the above-mentioned ordering which satisfies the condition $|c_n| \geq \epsilon$; $s_2$ is the subscript value of the second such $c_n$, etc.

It should be stressed that the ordering defined by the algorithm in FIG. 7 and illustrated in FIG. 6 is only one of many orderings that could be used. It is important only that the same ordering be used for all objects.

The integers $s_n$ can be considered to be a first set of shape descriptors of the object. A second descriptor S is the number of the first descriptors $s_n$. In other words, S is the number of Fourier coefficients whose absolute value is greater than or equal to the noise tolerance $\epsilon$.

Additional shape descriptors $a_n$ and $b_{n,j}$ are calculated as follows. If S is less than 2 then the parameters r and J shall be set to zero. In such cases, the shape of the object will be a circle. However, if S is greater than or equal to 2, the parameter r is calculated. Parameter r is defined as the greatest common divisor of the integers:

$$s_n - s_1, \, n = 2, \ldots, S. \quad \text{Eq. 9}$$

This parameter can be computed using the Euclidean algorithm described in theorem 1.11, page 7 of *An Introduction to the Theory of Numbers*, by I. Niven and H. S. Zuckerman, New York: Wiley, 1972.

The parameter J is defined as the smallest of all integers R which satisfy the condition that r is the greatest common divisor of the integers:

$$s_n - s_1, \, n = 1, \ldots, R \quad \text{Eq. 10}$$

The third shape descriptors $a_n$ are defined as follows:

$$a_n \triangleq |c_{s_n}|, \, n = 1, \ldots, J. \quad \text{Eq. 11}$$

The fourth shape descriptors $b_n$, j are defined as follows:

$$b_{n,j} \triangleq c_{s_1}^{(s_n - s_j)/r} c_{s_j}^{(s_1 - s_n)/r} c_{s_n}^{(s_j - s_1)/r}, \, n = j+1, \ldots, S; j = 2, \ldots, J. \quad \text{Eq. 12}$$

The descriptors S, J, r, $a_n$, and $b_{n,j}$ are stored in memory in computer 18 as shape descriptors for object 10. Other descriptors describing the orientation, size and location of object 10 may also be calculated and stored. The orientation descriptor is calculated from the following formula:

$p_n$, $n = 2, \ldots, S$, is any sequence of integers for which $$\sum_{n=2}^{J} p_n(s_n - s_1) = r. \quad \text{Eq. 13}$$

The integers $p_n$ can be computed by the method described in section 5.4, page 104 of the aforementioned book by Niven et al which is incorporated by reference. The parameters $\theta$ and $\phi$ are defined as:

$\theta \triangleq$ phase of $$\prod_{j=2}^{J} \left(\frac{c_{s_j}}{c_{s_1}}\right)^{p_j} \quad (0 \leq \theta < 2\pi). \quad \text{Eq. 14}$$

and $\phi \triangleq$ phase of $c_{s_1}$ $(0 \leq \phi < 2\pi)$. \quad Eq. 15

The orientation descriptor $\alpha$ is defined as:

$$\alpha \triangleq \left(\phi - \theta \frac{s_1}{r}\right) \mod \frac{2\pi}{r} \left(0 \leq \alpha < \frac{2\pi}{r}\right). \quad \text{Eq. 16}$$

The location descriptor C is calculated according to the following formula:

$$C \triangleq \frac{d_N}{2\pi} c_0. \quad \text{Eq. 17}$$

Finally, the size descriptor $d_N$ is defined and calculated pursuant to equation 4 as discussed above.

Figure 8:
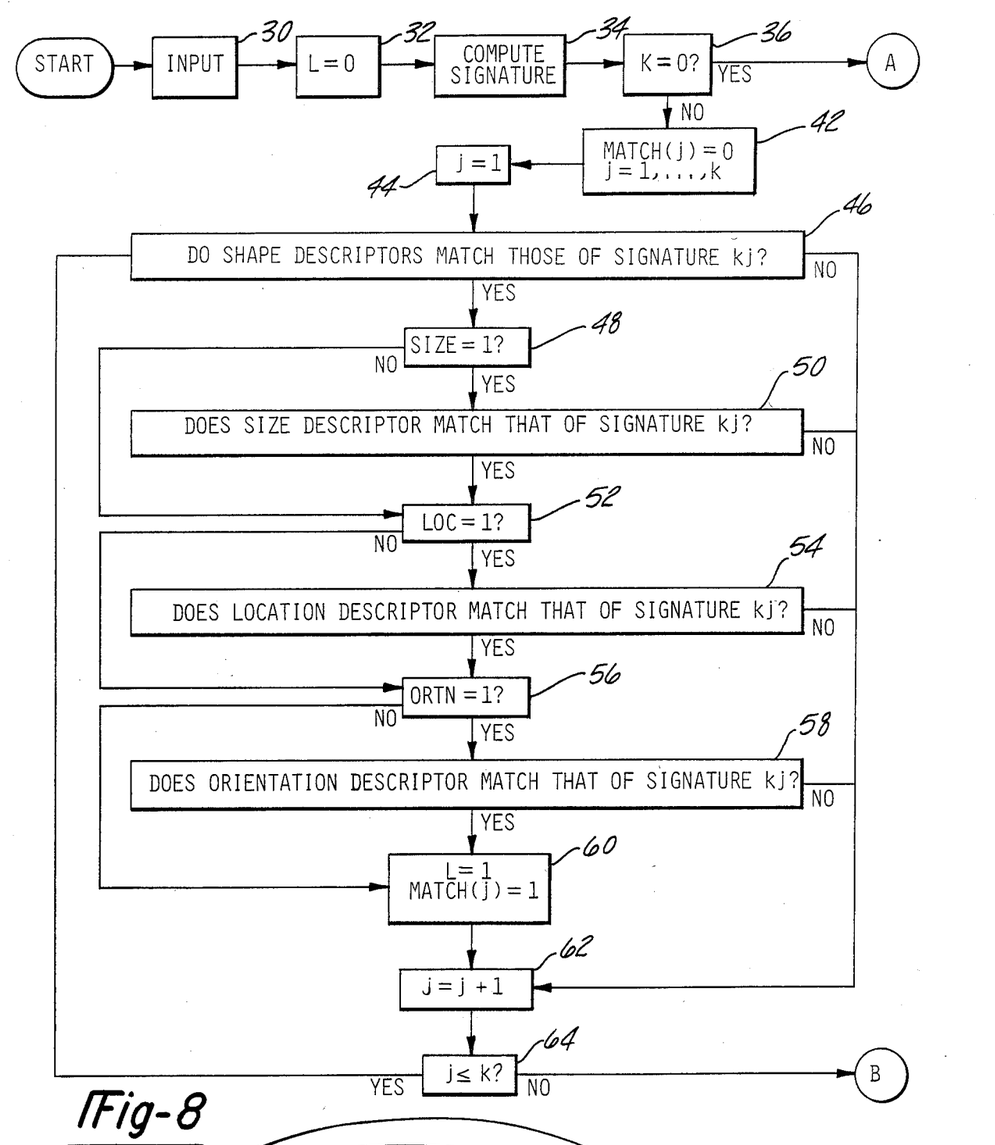
FIGS. 8 and 9 combine to form a flow chart illustrating an automatic recognition process according to the teachings of the preferred embodiment.
Figure 9:
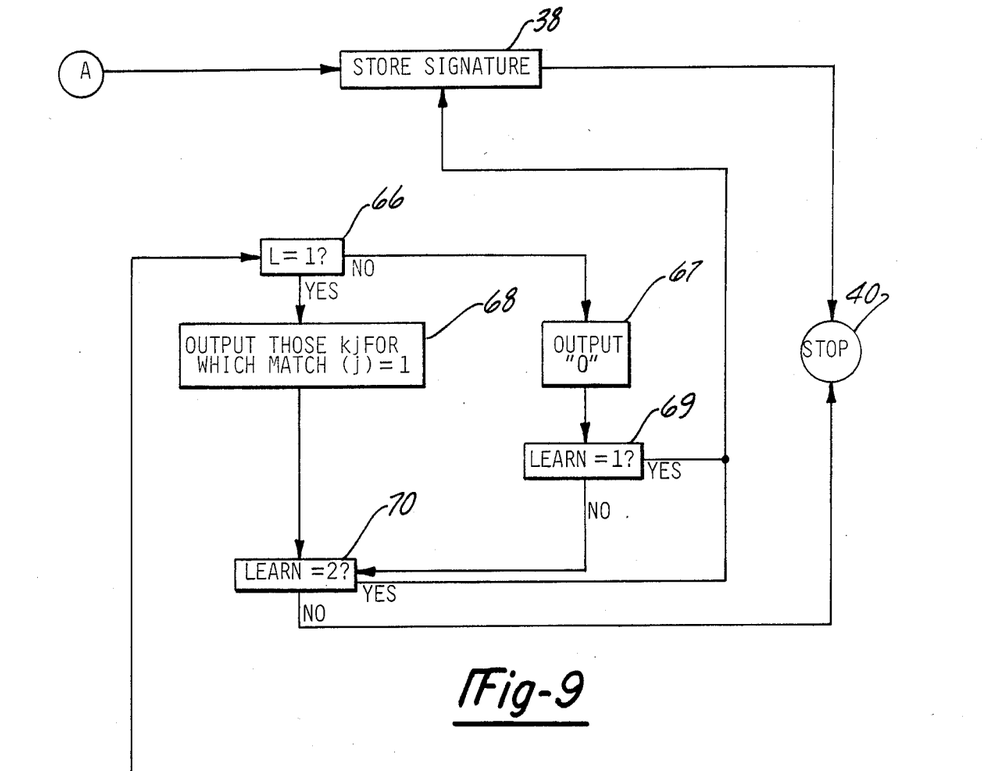

The flow charts of FIGS. 8 and 9 illustrate a method of storing the signatures of various objects and using them to automatically recognize similarly calculated signatures for other objects. Certain control parameters are input to computer 18 in step 30. A flag parameter is initialized in step 32 and the signature of the object is computed in step 34. One of the input parameters is K. If K=0 then the signature of the object (the shape descriptors, orientation descriptor, size descriptor and location descriptor) is computed and stored as illustrated in step 38. If K is greater than 0, this indicates that after computing the signature of the object, certain of its descriptors are to be compared with corresponding descriptors for various other objects which have previously been computed and stored. Each of the stored signatures has an identifying number. The input sequence of numbers $K_j$, $j=1 \ldots K$, are the identifying numbers of the signatures with which the new signature is to be compared. The input parameters SIZE, LOC, and ORTN have the value of 0 or 1 and they indicate which additional descriptors, other than the shape descriptors, are to be used in the comparison. The shape descriptors S, $a_n$, and $b_{n,j}$ are always used. Preferably, the additional shape descriptors J, r, and $s_n$, $n=1, \ldots, S$; are also used in the comparison of the shape descriptors. If it is desired to also compare the size, location and/or orientation descriptors then the inputs SIZE, LOC, and ORTN are set to 1. To allow for noise, the criteria for a match will not necessarily require that the corresponding descriptors be exactly equal, but only that the absolute values of their differences be less than certain noise tolerances which were previously determined and input to computer 18. The identifying numbers of the signatures with which a match is made will be output. If no matches are made, then the number 0 is output. The LEARN parameter (0, 1 or 2) has effect only when K is greater than 0, i.e. when comparisons with stored signatures are to be made. If LEARN equals 0, then the new signature is not stored, regardless of whether any matches are made. If LEARN equals 1, then the new signature is stored only if no matches are made. If LEARN equals 2, then the new signature is always stored.

C. Particular Example

Figure 10:
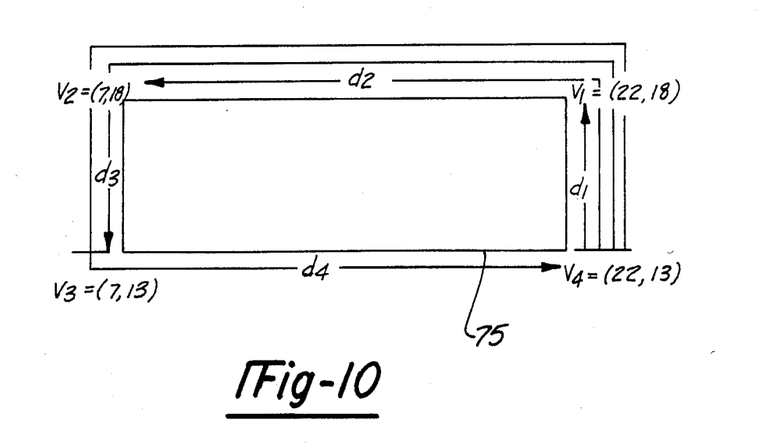
FIG. 10 is a view schematically illustrating one example of an object whose descriptors are calculated in a particular example described in the specification.

The following description is an example using the formulae described above to calculate the shape, size, orientation and location descriptors for a rectangular object 75 having four vertices, v1, v2, v3, and v4 with their associated pixel coordinates having the values identifed in FIG. 10. It should be understood, however, that the present invention can be used to recognize any arbitrary shapes and that the following example is a simplified one to aid the reader in understanding the operation of the invention.

There are four vertices for object 75 and therefore, $N=4$. From equation 2:

$$x_1 = 22, x_2 = 7, x_3 = 7, x_4 = 22$$
$$y_1 = 18, y_2 = 18, y_3 = 13, y_4 = 13$$
$$x_0 = x_N = x_4 = 22$$
$$y_0 = y_N = y_4 = 13$$

Eq. 18

It follows from equation 3 that:

$$z_0 = 22 + 13i, z_1 = 22 + 18i, z_2 = 7 + 18i,$$
$$z_3 = 7 + 13i, z_4 = 22 + 13i$$

Eq. 19

The size parameter $d_N$ is the sum of the arc lengths between each vertex; here $d_N$ is equal to $d_4$. Each of the arc lengths $d_1$, $d_2$, $d_3$, and $d_4$ are pictorially illustrated in FIG. 10 and are calculated using equation 4 as follows:

$$d_1 = |z_1 - z_0| = [(x_1 - x_0)^2 + (y_1 - y_0)^2]^{\frac{1}{2}} = [(22 - 22)^2 + (18 - 13)^2]^{\frac{1}{2}}$$
$$= [0^2 + 5^2]^{\frac{1}{2}} = 5.$$

Eq. 20

$$d_2 = \sum_{k=1}^{2} |z_k - z_{k-1}| = |z_1 - z_0| + |z_2 - z_1|$$
$$= d_1 + [(x_2 - x_1)^2 + (y_2 - y_1)^2]^{\frac{1}{2}}$$
$$= 5 + [(7 - 22)^2 + (18 - 18)^2]^{\frac{1}{2}}$$
$$= 20.$$

$$d_3 = \sum_{k=1}^{3} |z_k - z_{k-1}|$$
$$= |z_1 - z_0| + |z_2 - z_1| + |z_3 - z_2|$$
$$= d_2 + [(x_3 - x_2)^2 + (y_3 - y_2)^2]^{\frac{1}{2}}$$
$$= 20 + [(7 - 7)^2 + (13 - 18)^2]^{\frac{1}{2}}$$
$$= 25.$$

$$d_4 = \sum_{k=1}^{4} |z_k - z_{k-1}|$$
$$= |z_1 - z_0| + |z_2 - z_1| + |z_3 - z_2| + |z_4 - z_3|$$
$$= d_3 + [(x_4 - x_3)^2 + (y_4 - y_3)^2]^{\frac{1}{2}}$$
$$= 25 + [(22 - 7)^2 + (13 - 13)^2]^{\frac{1}{2}}$$
$$= 40.$$

Summarizing,
$d_1 = 5, d_2 = 20, d_3 = 25, d_4 = 40.$
$\therefore d_N = d_4 = 40$ The parameters $\theta_n$ and $w_n$ are calculated from equations 5 and 6 as follows:

$$\theta_1 = \frac{2\pi}{d_4} d_1 = \frac{2\pi}{40} 5 = \frac{\pi}{4}.$$

Eq. 21

$$\theta_2 = \frac{2\pi}{d_4} d_2 = \frac{2\pi}{40} 20 = \pi.$$

$$\theta_3 = \frac{2\pi}{d_4} d_3 = \frac{2\pi}{40} 25 = \frac{5\pi}{4}.$$

$$\theta_4 = \frac{2\pi}{d_4} d_4 = \frac{2\pi}{40} 40 = 2\pi.$$

$$\theta_0 = 0.$$

Summarizing, $$\theta_0 = 0, \theta_1 = \frac{\pi}{4}, \theta_2 = \pi, \theta_3 = \frac{5\pi}{4}, \theta_4 = 2\pi.$$

Eq. 22

$$w_0 = e^{-i\theta_0} = e^{-i \cdot 0} = \cos(0) + i\sin(0) = 1.$$

$$w_1 = e^{-i\theta_1} = e^{-i\frac{\pi}{4}} = \cos\left(-\frac{\pi}{4}\right) + i\sin\left(-\frac{\pi}{4}\right) = \frac{1}{\sqrt{2}} - \frac{i}{\sqrt{2}}.$$

$$w_2 = e^{-i\theta_2} = e^{-i\pi} = \cos(-\pi) + i\sin(-\pi) = -1.$$

$$w_3 = e^{-i\theta_3} = e^{-i\frac{5\pi}{4}} = \cos\left(-\frac{5\pi}{4}\right) + i\sin\left(-\frac{5\pi}{4}\right) = -\frac{1}{\sqrt{2}} + \frac{i}{\sqrt{2}}.$$

$$w_4 = e^{-i\theta_4} = e^{-i2\pi} = \cos(-2\pi) + i\sin(-2\pi) = 1.$$

Summarizing, $$w_0 = 1, w_1 = e^{-i\frac{\pi}{4}} = \frac{1}{\sqrt{2}} - \frac{i}{\sqrt{2}}, w_2 = e^{-i\pi} = -1,$$

-continued
$$w_3 = e^{-i\frac{5\pi}{4}} = -\frac{1}{\sqrt{2}} + \frac{i}{\sqrt{2}}, w_4 = 1.$$

The zero order Fourier coefficient for the boundary of object 75 is calculated from equation 7 as follows:

$$c_0 = \frac{1}{2d_4}\left[z_0(\theta_1 - \theta_3 + 2\pi) + \sum_{n=1}^{3} z_n(\theta_{n+1} - \theta_{n-1})\right] \quad \text{Eq. 23}$$

$$= \frac{1}{80}[z_0(\theta_1 - \theta_3 + 2\pi) + z_1(\theta_2 - \theta_0) + z_2(\theta_3 - \theta_1) + z_3(\theta_4 - \theta_2)]$$

$$= \frac{29\pi}{40} + \frac{31\pi}{40}i.$$

Letting M equal 5, the other Fourier coefficients are calculated from equation 8. Beginning arbitrarily with the $c_{-5}$ coefficient it is calculated as follows:

$$c_{-5} = \frac{1}{40(-5)^2}\sum_{n=1}^{4}\frac{(z_n - z_{n-1})(w_n^{-5} - w_{n-1}^{-5})}{\theta_n - \theta_{n-1}} \quad \text{Eq. 24}$$

$$= \frac{1}{1000}\left[\frac{(z_1 - z_0)(w_1^{-5} - w_0^{-5})}{\theta_1 - \theta_0} + \frac{(z_2 - z_1)(w_2^{-5} - w_1^{-5})}{\theta_2 - \theta_1} + \frac{(z_3 - z_2)(w_3^{-5} - w_2^{-5})}{\theta_3 - \theta_2} + \frac{(z_4 - z_3)(w_4^{-5} - w_3^{-5})}{\theta_4 - \theta_3}\right]$$

$$= \frac{1}{25\pi}[1 - (1 + \sqrt{2})i].$$

The other Fourier coefficients $c_m$ are calculated in a similar manner. The results are:

$$c_{-5} = \frac{1}{25\pi}[1 - (1 + \sqrt{2})i] \quad \text{Eq. 25}$$

$$c_{-4} = 0$$

$$c_{-3} = \frac{1}{9\pi}(1 - \sqrt{2} - i)$$

$$c_{-2} = 0$$

$$c_{-1} = \frac{1}{\pi}[1 + (\sqrt{2} - 1)i]$$

$$c_0 = \frac{29\pi}{40} + \frac{31\pi}{40}i$$

$$c_1 = \frac{1}{\pi}(1 + \sqrt{2} - i)$$

$$c_2 = 0$$

$$c_3 = \frac{1}{9\pi}[1 - (1 + \sqrt{2})i]$$

$$c_4 = 0$$

$$c_5 = \frac{1}{25\pi}(1 - \sqrt{2} - i).$$

Using the algorithm set forth in FIG. 7 and the ordering sequence of FIG. 6, the values of the descriptors S and $s_n$ are:

$$S=6, s_1=1, s_2=-1, s_3=-3, s_4=3, s_5=-5, s_6=5. \quad \text{Eq. 26}$$

From a visual inspection of the values of Fourier coefficients in Eq. 25, it can be seen that there are six nonzero Fourier coefficients (not including the zero order coefficient $c_0$) and, therefore, S should equal 6. Testing the Fourier coefficients in the given order shows that the first nonzero Fourier coefficient is $c_1$ and, therefore $s_1$ equals 1. The next nonzero Fourier coefficient in the prescribed order is $c_{-1}$ and, therefore $s_2$ equals $-1$ and so forth. The next step is to calculate r which is the greatest common divisor of the integers defined in equation 9. The values of these integer are set forth below:

$$s_2-s_1=-2, s_3-s_2=-4, s_4-s_1=2, s_5-s_1=-6,$$
$$s_6-s_1=4. \quad \text{Eq. 27}$$

Therefore, r is 2 which is the greatest common divisor of the integers $-2, -4, 2, -6$ and 4. It should be noted that the parameter r will always be $\geq 2$ when the object has rotational symmetry as with the rectangular object 75 shown in FIG. 10. The primary purpose of calculating the parameter J is to limit the number of required shape descriptors $a_n$ and $b_{n,j}$. As per equation 10, J is in this example equal to 2. This is because r is the greatest common divisor of the difference $s_2-s_1$. J is the subscript value n which in this instance is 2. If, on the other hand, the differences of the integers $s_n-s_1$ were instead 6, 12, 4, 8 and 18 then J would equal 4 since r would be 2 and 2 is the greatest common divisor of the differences $s_2-s_1, s_3-s_1$, and $s_4-s_1$, i.e., 6, 12, and 4.

The shape descriptors $a_n$ are calculated according to equation 11 as follows:

$$a_1 = |c_{s_1}| = |c_1| = \frac{1}{\pi}[(1 + \sqrt{2})^2 + (-1)^2]^{\frac{1}{2}} \quad \text{Eq. 28}$$

$$= \frac{1}{\pi}[1 + 2\sqrt{2} + 2 + 1]^{\frac{1}{2}}$$

$$= \frac{1}{\pi}(4 + 2\sqrt{2})^{\frac{1}{2}}.$$

$$a_2 = |c_{s_2}| = |c_{-1}| = \frac{1}{\pi}[1^2 + (\sqrt{2} - 1)^2]^{\frac{1}{2}}$$

$$= \frac{1}{\pi}[1 + 2 - 2\sqrt{2} + 1]^{\frac{1}{2}}$$

$$= \frac{1}{\pi}(4 - 2\sqrt{2})^{\frac{1}{2}}.$$

The shape descriptors $b_{n,j}$ are calculated according to equation 12 as follows:

$$b_{3,2} = c_{s_1}^{(s_3-s_2)/r} c_{s_2}^{(s_1-s_3)/r} c_{s_3}^{(s_2-s_1)/r} \quad \text{Eq. 29}$$

$$= c_1^{(-3+1)/2} c_{-1}^{(1+3)/2} c_{-3}^{(-1-1)/2}$$

$$= c_1^{-1} c_{-1}^2 c_{-3}^{-1}$$

$$= \frac{\pi}{(1 + \sqrt{2} - i)} \cdot \frac{[1 + (\sqrt{2} - 1)i]^2}{\pi^2} \cdot \frac{9\pi}{(1 - \sqrt{2} - i)}$$

$$= 9(1 - \sqrt{2}).$$

$$b_{4,2} = c_{s1}^{(s4-s2)/r} c_{s2}^{(s1-s4)/r} c_{s4}^{(s2-s1)/r}$$

$$= c_1^{(3+1)/2} c_{-1}^{(1-3)/2} c_3^{(-1-1)/2}$$

$$= c_1^2 c_{-1}^{-1} c_3^{-1}$$

$$= \frac{(1+\sqrt{2}-i)^2}{\pi^2} \cdot \frac{\pi}{[1+(\sqrt{2}-1)i]} \cdot \frac{9\pi}{[1-(1+\sqrt{2})i]}$$

$$= 9(1 + \sqrt{2}).$$

$$b_{5,2} = c_{s1}^{(s5-s2)/r} c_{s2}^{(s1-s5)/r} c_{s5}^{(s2-s1)/r}$$

$$= c_1^{(-5+1)/2} c_{-1}^{(1+5)/2} c_{-5}^{(-1-1)/2}$$

$$= c_1^{-2} c_{-1}^3 c_{-5}^{-1}$$

$$= \frac{\pi^2}{(1+\sqrt{2}-i)^2} \cdot \frac{[1+(\sqrt{2}-1)i]^3}{\pi^3} \cdot \frac{25\pi}{[1-(1+\sqrt{2})i]}$$

$$= 25(7 - 5\sqrt{2}).$$

$$b_{6,2} = c_{s1}^{(s6-s2)/r} c_{s2}^{(s1-s6)/r} c_{s6}^{(s2-s1)/r}$$

$$= c_1^{(5+1)/2} c_{-1}^{(1-5)/2} c_5^{(-1-1)/2}$$

$$= c_1^3 c_{-1}^{-2} c_5^{-1}$$

$$= \frac{[1+\sqrt{2}-i]^3}{\pi^3} \cdot \frac{\pi^2}{[1+(\sqrt{2}-1)i]^2} \cdot \frac{25\pi}{[1-\sqrt{2}-i]}$$

$$= 25(7 + 5\sqrt{2}).$$

Summarizing, $$b_{3,2} = 9(1-\sqrt{2})$$

$$b_{4,2} = 9(1+\sqrt{2})$$

$$b_{5,2} = 25(7-5\sqrt{2})$$

$$b_{6,2} = 25(7+5\sqrt{2})$$

Thus, for this simplified example, all of the necessary shape descriptors have been calculated. The shape descriptors are stored in convenient form in the computer memory as a signature for an object having the rectangular shape of object 75 shown in FIG. 10. It should be realized that while these calculations look complex they can be calculated in a fraction of a second using modern day computers. These shape descriptors form part of the signature for object 75. If another object is detected and its shape descriptors match the stored shape descriptors of object 75 (within a predetermined noise tolerance) then that object has the same shape as object 75. It may be convenient to compare some of the parameters such as r, J and $s_n$'s as a preliminary screening process since if no matches occur for these parameters then the second object does not have the same shape. However, it is necessary to find a match between the descriptors S, $a_n$'s, and $b_{n,j}$'s to confirm that a match is made.

Going on to calculate the orientation descriptor for object 75, $\theta$ is calculated according to equation 14 as follows. First, since $s_1 = 1$ and $s_2 = -1$, $s_2 - s_1 = -2$ and therefore $(-1)(s_2-s_1) = 2 = r$. Thus, equation 13 will be satisfied by $p_2 = -1$. Then, $\theta$ is the phase of $$\prod_{j=2}^{2} \left( \frac{c_{sj}}{c_{s1}} \right)^{-1} = \frac{c_{s1}}{c_{s2}} = \frac{c_1}{c_{-1}} \quad \text{Eq. 30}$$

$$= \frac{1+\sqrt{2}-i}{1+(\sqrt{2}-1)i}$$

$$= 1 + \frac{1}{\sqrt{2}} - \left(1 + \frac{1}{\sqrt{2}}\right) i.$$

$$\theta = \tan^{-1}\left[ \frac{-\left(1 + \frac{1}{\sqrt{2}}\right)}{1 + \frac{1}{\sqrt{2}}} \right]$$

$$= \tan^{-1}(-1)$$

$$= \frac{7\pi}{4}.$$

$\phi$ is calculated according to equation 15 as follows:

$\phi$ is the phase of $$c_{s1} = c_1 = \frac{1}{\pi}(1 + \sqrt{2} - i). \quad \text{Eq. 31}$$

$$\phi = \tan^{-1}\left[ \frac{-1}{\sqrt{2}+1} \right]$$

$$= \tan^{-1}\left[ \frac{1-\sqrt{2}}{(\sqrt{2}+1)(\sqrt{2}-1)} \right]$$

$$= \tan^{-1}(1 - \sqrt{2}).$$

$$\tan \phi = 1 - \sqrt{2}$$

$$\tan(2\phi) = \frac{2 \tan \phi}{1 - (\tan \phi)^2}$$

$$= -1$$

$$\therefore 2\phi = -\frac{\pi}{4},$$

$$\phi = -\frac{\pi}{8},$$

$$\text{or } \phi = 2\pi - \frac{\pi}{8}$$

$$= \frac{15\pi}{8}.$$

Since it is required that $0 \leq \phi < 2\pi$, $$\phi = \frac{15\pi}{8}.$$

Therefore, it follows that the orientation descriptor $\alpha$ according to equation 16 is:

$$\alpha = \left(\phi - \theta \frac{s_1}{r}\right) \mod \frac{2\pi}{r} \qquad \text{Eq. 32}$$

$$= \left(\frac{15\pi}{8} - \frac{7\pi}{4} \cdot \frac{1}{2}\right) \mod \pi$$

$$= \left(\frac{15\pi}{8} - \frac{7\pi}{8}\right) \mod \pi$$

$$= \pi \mod \pi$$
$$= 0.$$

The location descriptor C is calculated according to equation 17 as follows:

$$C = \frac{d_N}{2\pi} c_0 \qquad \text{Eq. 33}$$

$$= \frac{40}{2\pi}\left(\frac{29\pi}{40} + \frac{31\pi}{40} i\right)$$

$$= \frac{29}{2} + \frac{31}{2} i.$$

It will be remembered that the size descriptor $d_N$ has been previously calculated as being 40 (see equation No. 20.) Thus, the size, location and orientation descriptors can also be stored and used to compare similarly calculated size, location and orientation descriptors of other objects.

Various modifications to the present invention will become apparent to one skilled in the art after studying the specification, drawings and claims. One such modification may be the utilization of the area of the object instead of the perimeter in the calculations of the Fourier coefficients and location descriptors. In such case, the parameter $d_N$ in equations 7 and 8 may be replaced with the square root of the area of the object. In equation 17, the location descriptor would simply be the x and y coordinates of the centroid of the object. Therefore, while this invention has been described in connection with certain examples thereof, no limitation is intended thereby except as defined in the following claims.

I claim:

1. A method of automatically recognizing objects comprising:
   a. scanning said objects with a scanning means such as a video camera to produce signals representing each of said objects;
   b. converting the signals into a digital image where the pixel coordinates of the boundary of each object have been identified and stored as data;
   c. calculating from said data a series of Fourier coefficients $c_i$ associated with the boundary of the object;
   d. testing a given number N of the Fourier coefficients, except for the zero order Fourier coefficient, in a predetermined order for absolute values which exceed a predetermined value and generating a series of integers $s_n$ with values corresponding to the subscript of each coefficient tested having an absolute value exceeding the predetermined value, so that:
      $s_1$ = the subscript value of the first Fourier coefficient tested whose absolute value exceeds the predetermined value;
      $s_2$ = the subscript value of the next Fourier coefficient tested whose absolute value exceeds the predetermined value; etc
   e. calculating a first descriptor S as the number of Fourier coefficients $c_{sn}$, whose absolute values exceed the predetermined value, identified in step b;
   f. calculating the greatest common divisor r of the integers:

$$s_n - s_1, \; n = 2, \ldots, S \qquad \text{Eq. 9}$$

g. calculating an integer J which is the smallest of all integers R which satisfy the condition that r is the greatest common divisor of the integers:

$$s_n - s_1, \; n = 2, \ldots, R \qquad \text{Eq. 10}$$

h. calculating second descriptors $a_n$ as the absolute values of the Fourier coefficients $c_i$ whose absolute value exceeds the predetermined value, according to the definition:

$$a_n \triangleq |c_{sn}|, \; n = 1, \ldots, J \qquad \text{Eq. 11}$$

i. calculating a series of third descriptors $b_{n,j}$ according to the following definition:

$$b_{n,j} \triangleq c_{s1}{}^{(s_n s_j)/r} c_{sj}{}^{(s1-s_n)/r} c_{sn}{}^{(s_j-s_1)/r}, \; n=J+1, \ldots, S; \; j=2, \ldots, J$$

j. storing at least the first, second and third descriptors in a digital memory; and
   k. comparing the stored descriptors with descriptors of other objects calculated according to steps c–i to thereby automatically recognize objects of the same shape.

2. The method of claim 1 wherein an orientation descriptor $\alpha$ is also calculated according to the following formulae:
   $p_n$, n = 2, ..., S, is any sequence of integers for which $$\sum_{n=2}^{J} p_n(s_n - s_1) = r \qquad \text{Eq. 13}$$

$\theta \triangleq$ phase of $$\prod_{j=2}^{J} \pi \left(\frac{c_{sj}}{c_{s1}}\right)^{p_j} \quad (0 \leq \theta < 2\pi) \qquad \text{Eq. 14}$$

$\phi \triangleq$ phase of $c_{s1}$ $(0 \leq \phi < 2\pi)$ \qquad Eq. 15

$$\alpha \triangleq \left(\phi - \theta \frac{s_1}{r}\right) \mod \frac{2\pi}{r} \left(0 \leq \alpha < \frac{2\pi}{r}\right) \qquad \text{Eq. 16}$$

storing the orientation descriptor;

and comparing the stored orientation descriptor with similarly calculated orientation descriptors of other objects.

3. The method of claim 1 which further comprises:
calculating a size descriptor associated with the size of the object in the digital image;
storing the size descriptor; and
comparing the stored size descriptor with similarly calculated size descriptors of other objects.

4. The method of claim 1 which further comprises:
calculating a location descriptor associated with the location of the object in the digital image;
storing the location descriptor; and
comparing the stored location descriptor with similarly calculated location descriptors of other objects.

5. In a method of automatically recognizing objects in a digital image, the method comprising:
   a. Scanning objects with a scanning means such as a camera to produce signals representing the objects;
   b. converting the signals into a digital image;
   c. detecting the boundaries of each object in the digital image to produce data representing the boundaries;
   d. converting said data to data representing the pixel coordinates of the polygons defining the boundary of each of the objects, with x and y coordinates of the vertices of the boundaries being defined as $$v_n = (x_n, y_n), n=1, \ldots, N \quad \text{Eq. 1}$$

where N is the number of vertices;
   e. calculating parameters according to the following formulae:

$$x_0 \triangleq x_N, \ y_0 \triangleq y_N \quad \text{Eq. 2}$$

$$z_n \triangleq x_n + i y_n, \ n=0, \ldots, N \ (i=\sqrt{-1}) \quad \text{Eq. 3}$$

$$d_n \triangleq \sum_{k=1}^{n} |z_k - z_{k-1}| = \sum_{k=1}^{n} [(x_k - x_{k-1})^2 + (y_k - y_{k-1})^2]^{\frac{1}{2}}, \quad \text{Eq. 4}$$

$$n = 1, \ldots, N$$

$$\theta_n \triangleq \frac{2\pi}{d_N} d_n, \ n = 1, \ldots, N, \ \theta_0 \triangleq 0 \quad \text{Eq. 5}$$

$$w_n \triangleq e^{-i\theta_n}, \ n = 0, \ldots, N \quad \text{Eq. 6}$$

f. calculating a series of Fourier coefficients where the zero order coefficient is defined as:

$$c_0 \triangleq \frac{1}{2d_N} \left[ z_0(\theta_1 - \theta_{N-1} + 2\pi) + \sum_{n=1}^{N-1} z_n(\theta_{n+1} - \theta_{n-1}) \right] \quad \text{Eq. 7}$$

and wherein other Fourier coefficients are calculated according to the formula:
   for $m \neq 0$, $|m| \leq M$, $$c_m \triangleq \frac{1}{d_N m^2} \sum_{n=1}^{N} \frac{(z_n - z_{n-1})(w_n^m - w_{n-1}^m)}{\theta_n - \theta_{n-1}} \quad \text{Eq. 8}$$

g. calculating a series of first descriptors $s_n$ by testing a given number of the Fourier coefficients, excepting the zero order Fourier coefficient, in a predetermined order for absolute values which exceed a predetermined value, and assigning the first descriptors with integer values corresponding to the subscript of each Fourier coefficient tested having an absolute value exceeding the predetermined value, so that:
   $s_1$ = the subscript value of the first Fourier coefficient tested whose absolute value exceeds the predetermined value;
   $s_2$ = the subscript value of the next Fourier coefficient tested whose absolute value exceeds the predetermined value; etc.

h. calculating a second descriptor S as the number of the first descriptors identified in step c;
   i. calculating the greatest common divisor r of the integers:

$$s_n - s_1, \ n = 2, \ldots, S \quad \text{Eq. 9}$$

j. calculating an integer J which is the smallest of all integers R which satisfy the condition that r is the greatest common divisor of the integers:

$$s_n - s_1, \ n = 2, \ldots, R \quad \text{Eq. 10}$$

k. calculating a series of third descriptors $a_n$ according to the formula:

$$a_n \triangleq |c_{s_n}|, \ n = 1, \ldots, J \quad \text{Eq. 11}$$

l. calculating a series of fourth descriptors $b_{n,j}$ according to the following definition:

$$b_{n,j} \triangleq c_{s_1}^{(s_n - s_j)/r} c_{s_j}^{(s_1 - s_n)/r} c_{s_n}^{(s_j - s_1)/r}, \ n = j+1, \ldots, S; \ j = 2, \ldots J \quad \text{Eq. 12}$$

m. calculating an orientation descriptor * according to the following formulae:
   $p_n, n = 2, \ldots, S$, is any sequence of integers for which $$\sum_{n=2}^{J} p_n(s_n - s_1) = r \quad \text{Eq. 13}$$

$\theta \triangleq$ phase of $$\prod_{j=2}^{J} \left( \frac{c_{sj}}{c_{s1}} \right)^{pj} \ (0 \leq \theta < 2\pi) \quad \text{Eq. 14}$$

$\phi \triangleq$ phase of $c_{s1}$ $(0 \leq \phi < 2\pi)$ $$\alpha \triangleq \left( \phi - \theta \frac{s_1}{r} \right) \mod \frac{2\pi}{r} \ \left( 0 \leq \alpha < \frac{2\pi}{r} \right) \quad \text{Eq. 16}$$

n. storing the first, second, third, fourth and orientation descriptors in a digital memory; and
   o. comparing the stored descriptors with descriptors of other objects calculated according to steps e–l to thereby detect similarities and differences between the objects.

6. The method of claim 5 which further comprises the steps of:
calculating size and location descriptors of the object;
storing the size and location descriptors in the digital memory; and
comparing the size and location descriptors with similarly calculated size and location descriptors of other objects.

* * * * *

UNITED STATES PATENT AND TRADEMARK OFFICE
CERTIFICATE OF CORRECTION

PATENT NO. : 4,573,197          Page 1 of 2

DATED : February 25, 1986

INVENTOR(S) : Thomas R. Crimmins

It is certified that error appears in the above-identified patent and that said Letters Patent is hereby corrected as shown below:

On the face page of the Patent, please insert:
Assignee: Environmental Research Institute of Michigan
          Ann Arbor, Michigan Column 6, line 23 "Pn, n-2" should be --Pn, n=2--.

Column 6, line 14 (Eq. 12) " $b_{n,j} \Delta c_{s1}^{(sn-sj)/r} c_{sj}^{(s1-sn)/r} c_{sn}^{(sj-s1)/r}, n = j+1,\ldots,S; j=2,\ldots,J.$ " should be -- $b_{n,j} \Delta c_{s1}^{(sn-sj)/r} c_{sj}^{(s1-sn)/r} c_{sn}^{(sj-s1)/r}, n = j+1,\ldots,S; j=2,\ldots,J.$ --.

Column 10, line 19 (Eq. 27) "$s_3 - s_2 = -4$" should be --$s_3 - s_1 = -4$--.

Column 14, line 24 (Eq. 10) this equation should be indented.

Column 14, line 36     This equation should be marked --Eq. 12--.

Column 14, line 36 "$(s_n s_j)$" should be --$(s_n - s_j)$--.

Column 14, line 36 "n = J + 1.....S:" should be --n = j + 1.....S:--.

Column 15, line 16 "In a" should be -- A --.

Column 16, line 30 " $b_{n,j} \Delta c_{s1}^{(sn-sj)/r} c_{sj}^{(s1-sn)/r} c_{sn}^{(sj-s1)/r}, n = j+1,\ldots,S; j=2,\ldots,J$ " should be -- $b_{n,j} \Delta c_{s1}^{(sn-sj)/r} c_{sj}^{(s1-sn)/r} c_{sn}^{(sj-s1)/r}, n = j+1,\ldots,S; j=2,\ldots,J$ --.

UNITED STATES PATENT AND TRADEMARK OFFICE
CERTIFICATE OF CORRECTION

PATENT NO. : 4,573,197          Page 2 of 2

DATED      : February 25, 1986

INVENTOR(S): Thomas R. Crimmins

It is certified that error appears in the above-identified patent and that said Letters Patent is hereby corrected as shown below:

Column 16, line 33 "*" should be -- α --.

Signed and Sealed this

Fourth Day of November, 1986

[SEAL]

Attest:

DONALD J. QUIGG

*Attesting Officer*      *Commissioner of Patents and Trademarks*